United States Patent Office 3,761,467
Patented Sept. 25, 1973

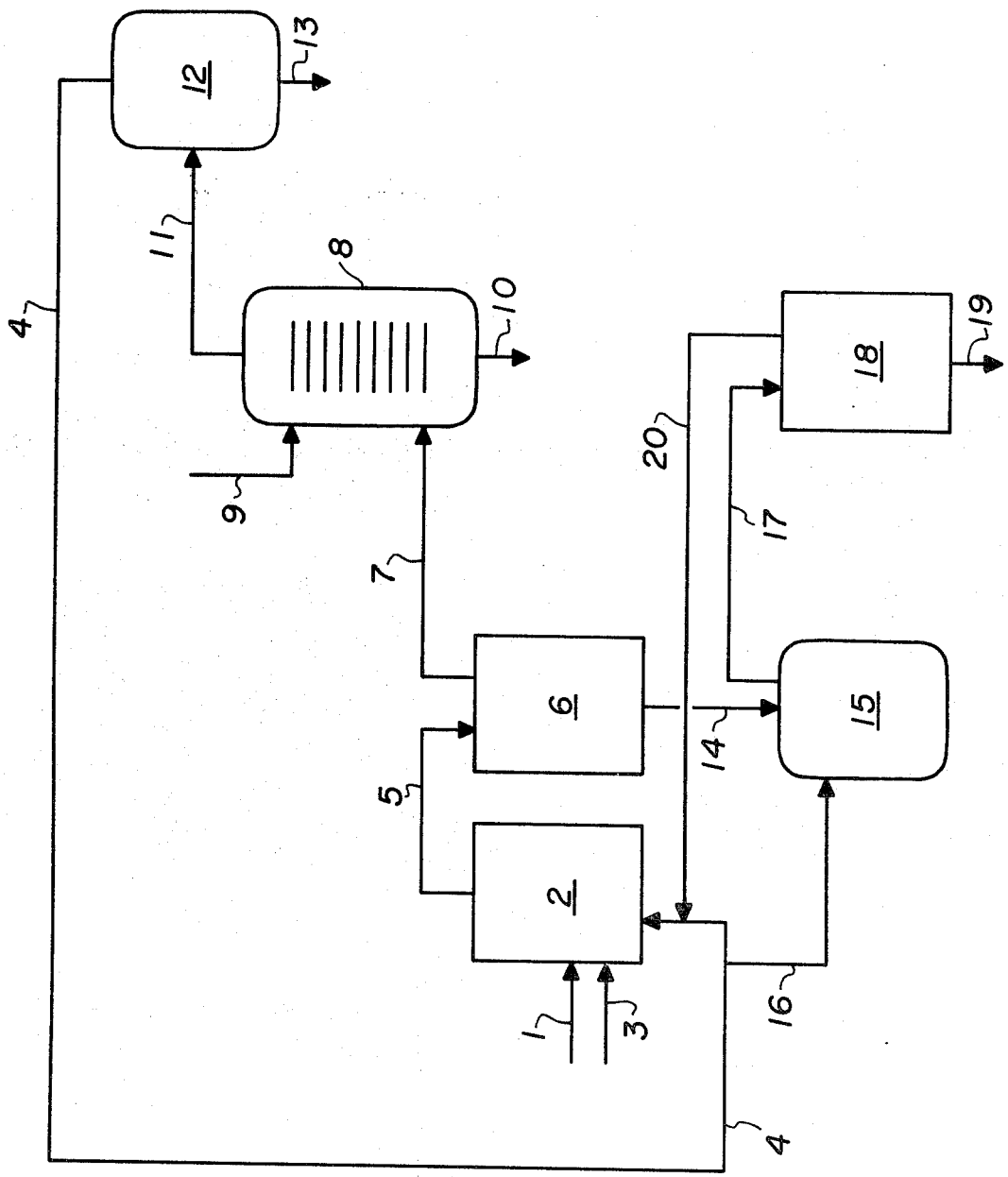

3,761,467
RECOVERY OF ε-CAPROLACTAM
Billy G. Williams, Petersburg, Va., and Francis Lewis Bohn, Morristown, N.J., assignors to Allied Chemical Corporation, New York, N.Y.
Filed Feb. 11, 1971, Ser. No. 114,436
Int. Cl. C07d 41/06
U.S. Cl. 260—239.3 A
11 Claims

ABSTRACT OF THE DISCLOSURE

A process for separating ε-caprolactam from an aqueous solution highly concentrated in both color-forming and oxidizable impurities whereby the solution is first extracted with an organic, water-immiscible solvent for ε-caprolactam, thereby separating the ε-caprolactam from the color-forming impurities and the resultant organic ε-caprolactam solution is extracted with an aqueous solution, thereby separating the ε-caprolactam from the oxidizable impurities.

---

The present invention relates to a process for the improved recovery of ε-caprolactam from mother liquor streams obtained from the crystallization or distillation of crude ε-caprolactam.

BACKGROUND OF THE INVENTION

Crude ε-caprolactam obtained from the Beckmann rearrangement of cyclohexanone oxime must be purified to render it suitable for use as monomer for the preparation of polycaprolactam. The crude ε-caprolactam can be purified by successive crystallizations from aqueous solution. The mother liquor obtained from the first crystallization contains the bulk of unwanted impurities as well as significant quantities of ε-caprolactam. This ε-caprolactam must be recovered from these impurities and can be recycled to the first crystallization step to improve the overall recovery of ε-caprolactam. This recovery is presently done by fractional distillation of the mother liquor. However, the recovery of ε-caprolactam is less than optimum with this method since hydrolysis reactions occur and the high temperatures required for distillation result in degradation and polymerization reactions of the lactam. Since a loss of even 1% of ε-caprolactam in the overall recovery represents a significant quantity in large scale commercial processes, an improved method of recovering ε-caprolactam from the mother liquor stream is highly desirable.

SUMMARY OF THE INVENTION

It is an object of the present invention to provide an improved process for recovering ε-caprolactam from concentrated impurities in a mother liquor stream obtained from the crystallization of crude ε-caprolactam.

Further objects will become apparent hereinafter.

According to the present process, ε-caprolactam can be recovered in excellent yield from mother liquor streams by a two-stage process whereby the mother liquor stream is first extracted with a water-immiscible organic solvent for ε-caprolactam which separates the ε-caprolactam from most of the color-forming impurities, and then the organic product stream extracted with an aqueous solution which separates the ε-caprolactam from most of the oxidizable impurities. This process provides for recovery of most of the ε-caprolactam from impurities as an aqueous solution suitable for recycle to the crystallization area and offers improved recovery of ε-caprolactam over conventional processes.

The organic solvent can be purified to separate out the bulk of the oxidizable impurities and recycled, adding to the economies of the present process. The aqueous raffinate stream from the first extraction can also be reextracted with solvent to remove dissolved ε-caprolactam and the resultant organic ε-caprolactam solution recycled to the first extraction step, thereby improving the overall recovery of ε-caprolactam from the mother liquor stream.

The criticality in the present process lies in the double extraction system whereby the ε-caprolactam is first separated from the bulk of color-forming impurities as an organic solution and then separated from the bulk of oxidizable impurities as an aqueous solution. The ε-caprolactam could be separated from a solution containing large amounts of both color-forming and oxidizable impurities without distillation was highly unexpected and surprising. We have found that about 80% of color-forming impurities and about 70% of oxidizable impurities are removed by the present process. Impurities able to be separated from ε-caprolactam by the present process include octahydrophenazine, aminocaproic acid, cyclohexanone oxime, cresol, cyclohexanone, benzene and ethyl benzene, as well as other impurities.

FIG. I is a flow diagram of the present process.

DETAILED DESCRIPTION OF THE INVENTION

According to the present process a mother liquor stream obtained from the crystallization of crude ε-caprolactam containing up to about 10% by weight of water and up to about 15% by weight of organic impurities is adjusted to contain about 4 to 16%, preferably 5 to 9%, by weight of water and is charged to a mixer with a ratio by volume of from 1:1 to 10:1, preferably 3:1 to 4:1 of a water-immiscible solvent for ε-caprolactam. The ε-caprolactam is extracted by the solvent which is withdrawn, leaving most of the color-forming impurities in the aqueous layer. The organic solvent product stream is extracted with water in a counter-current liquid-liquid extractor so that the ε-caprolactam is transferred to the aqueous layer. The bulk of the oxidizable impurities are retained in the organic layer.

The organic impurities which can be removed from the ε-caprolactam according to this process include both color-forming impurities, measured in A.P.H.A. units, and oxidizable impurities, measured as permanganate number, hereinafter referred to as PN.

The mother liquor stream is adjusted if required so as to contain from 4 to 16%, preferably 5–9%, by weight of water. The water serves as a solvent for the bulk of the color-forming impurities present and a minimum amount of about 4% by weight is required to maintain these impurities in solution. However, since ε-caprolactam is soluble in water, the amount of water present should be kept low to present undue losses of ε-caprolactam.

Optionally a small amount of alkali metal hydroxide, such as lithium, potassium or sodium hydroxide, i.e., from about 0.1% to 3.0%, preferably 0.1 to 0.25% by weight is added to the mother liquor stream. The alkali metal hydroxide serves to decrease the soluibility of ε-caprolactam in water and improves the separation of ε-caprolactam from the water soluble impurities.

The organic solvent extractant must be immiscible with water and must be a solvent for ε-caprolactam. Suitable solvents include aromatic hydrocarbons, such as benzene, toluene, the xylenes, and the like. The preferred solvent is toluene which is an excellent solvent for ε-caprolactam.

No particular type of apparatus is required for the organic extraction step and only good contact between the organic solvent and the mother liquor stream is required. A simple mixing tank can be employed. After mixing, the phases are allowed to separate. Preferably, the intimately stirred mixture is allowed to stand in a suitable phase separator wherein the organic product layer can be withdrawn in a continuous manner from one part of the separator and the aqueous raffinate stream continuously withdrawn from another part of the separator. If desired, the product layer can be further treated, as by centrifuging or coalescing, to remove any remaining aqueous solution.

If desired, the aqueous raffinate layer which contains a small amount of dissolved ε-caprolactam, can be extracted again with additional quantities of organic solvent. The resultant solvent solution can be recycled to the first extraction step. The aqueous raffinate stream containing the bulk of the color-forming impurities is discarded.

The organic product stream is charged to a suitable staged counter-current liquid-liquid extractor. The concentration of ε-caprolactam in the organic solvent can be up to about 28% by weight, and preferably is at least about 20% by weight. This concentration range ensures efficient extraction of the ε-caprolactam in the counter-current extractor and leaves less than 0.1% by weight of the ε-caprolactam in the organic raffinate stream. The organic stream is charged near one end of the extractor and water or other suitable aqueous solution, such as a dilute aqueous ε-caprolactam solution is charged near the other end. The aqueous lactam product stream containing the bulk of ε-caprolactam which is now separated from most of the oxidizable impurities is continuously withdrawn from one end of the reactor and is now suitable for recycle to the ε-caprolactam crystallization area. The organic solvent raffinate stream is continuously removed from the other end of the extractor. This solvent stream can be purified as by distillation to separate the solvent from unwanted oxidizable impurities and recycled to the first extraction step.

The aqueous extractant charged to the counter-current extractor can be water or water containing up to about 6% of ε-caprolactam obtained from other areas of the overall ε-caprolactam recovery system, such as crystallizer overheads, for example, to improve overall ε-caprolactam recovery.

The counter-current extractor is fitted with suitable agitator blades which ensures good contact between the aqueous and organic feed streams, but avoid formation of an emulsion between the immiscible liquids. A small amount, i.e., up to about 5% by weight, of a polar compound, such as sulfuric acid or ammonium sulfate, can be added to the aqueous feed stream to aid in preventing formation of emulsions.

The ratio of water to organic product stream fed to the counter-current extractor will vary depending upon the number of stages present in the extractor, and the temperature of extraction. In general, at least 5 stages should be employed to ensure recovery most of the ε-caprolactam and temperatures of extraction below about 60° C. should be employed. At higher temperatures the solubility equilibrium between ε-caprolactam and water and an organic solvent significantly shifts, increasing the concentration of ε-caprolactam in the organic phase, but this can be compensated for by utilizing a larger number of stages in the extractor.

The present process provides a method for recovering almost all of the ε-caprolactam present in mother liquor streams in form suitable for recycle to the ε-caprolactam crystallization area. Overall recovery of ε-caprolactam is improved over conventional methods and degradation and polymerization reactions are avoided. A particularly preferred embodiment of the present process can be described particularly with reference to the accompanying drawing.

The mother liquor feed stream, adjusted to proper water content if required, is fed through line 1 to a mixing tank 2. Caustic solution is concurrently fed through line 3 and the organic solvent fed through line 4 to the mixing tank 2. After agitating thoroughly, the resultant mixture is fed through line 5 to a settling tank 6 wherein the two phases are allowed to separate. The organic product layer containing the ε-caprolactam and organic solvent as well as most of the oxidizable impurities is drawn off through line 7 to the lowest stage of a counter-current liquid-liquid extractor 8. Concurrently, water or an aqueous solution is fed to the highest stage of the extractor 8 through line 9. The aqueous product stream is withdrawn through line 10. The organic solvent raffinate containing most of the oxidizable impurities is withdrawn through line 11 and charged to a distillation column 12 wherein the organic solvent is distilled off through line 4 for recycle to the mixing tank 2. The oxidizable impurities are periodically drawn off through line 13 to waste.

The aqueous raffinate phase from the settling tank 6 is withdrawn through line 14 to an extractor 15 wherein it is extracted with the organic solvent fed through bypass line 16. The mixture is fed through line 17 to a settling tank 18 wherein the two phases are allowed to separate. The aqueous layer containing most of the color-forming impurities is taken off to waste through line 19 and the solvent layer containing some recovered ε-caprolactam is recycled to line 4 through line 20.

The invention will be described in further detail in the following examples, but it is to be understood that the invention is not meant to be limited to the details disclosed therein. In the examples, all parts and percentages are by weight unless otherwise noted. Color numbers and PN numbers are given on a 100% ε-caprolactam basis.

EXAMPLE I

A mother liquor feed stream at 60–65° C. having a color of 16,000 and PN of 2240, containing 90.4% of ε-caprolactam, 5.2% of water, 2.7% of octahydrophenazine, 0.3% of aminocaproic acid, and 1422 p.p.m. of cyclohexanone oxime was charged to a mixing tank at a rate of 180 ml./min. Forty-five ml./min. of 30% sodium hydroxide in water was fed to the tank at 28° C. and 720 ml./min. of toluene at 28° C. was also fed to the tank. The toluene mother liquor ratio was 4:1 by volume and the diluted feed stream contained 0.25% sodium hydroxide. The resultant mixture having a temperature of 35° C. was stirred vigorously for an average of 23.8 minutes and transferred to a phase separator. The average residence time in the phase separator was 39.2 minutes. The toluene layer was taken off, and fed at a rate of 400 ml. min. to a coalescer and then to the lowest stage of a 16 stage counter-current extractor fitted with agitator blades and coalescer screens. The toluene layer contained 18.7% of ε-caprolactam, had a PN of 1760 and color of 3434. Dilute ε-caprolactam aqueous solution containing 1.4% of ε-caprolactam, having a PN of 45 and color of 440 was fed to the top stage of the counter-current extractor at a rate of 200 ml./min. The aqueous product solution withdrawn from the bottom of the extractor contained 20.1% of ε-caprolactam, had a PN of 640, and color of 4780 and contained 35 p.p.m. of cyclohexanone oxime, 374 p.p.m. of octahydrophenazine and 0.7% of aminocaproic acid. This stream is suitable for recycle to ε-caprolactam crystallization.

The raffinate toluene stream was withdrawn from the top of the counter-current extractor and distilled in a distillation column wherein the overhead temperature was maintained at 109° C. At a reflux ratio of 0.5:1 the PN content of the distillate was only 13. Thus this distillate was suitable for recycle to the first extraction.

The aqueous raffinate from the phase separator was collected at a rate of about 1.5 parts by volume per 38 parts by volume of the mother liquor feed stream. This raffinate contained 40.6% of ε-caprolactam, 6.2% of sodium hydroxide, was dark in color and had a PN content of 12,500. This stream was charged to an extractor and extracted with toluene. The toluene layer contained 38.7% of ε-caprolactam, had a color of 1440 and a PN content of 660, and was added to the toluene in the first extraction. The remaining aqueous raffinate stream contained only 0.19% of ε-caprolactam.

EXAMPLE II

A mother liquor feed stream containing 87.2% of ε-caprolactam, 9.7% of water, 0.01% of sodium hydroxide, 1.9% of octahydrophenazine, 5570 p.p.m. of cyclohexanone oxime, having a color of 7400 and a PN content of 2640 was fed at a rate of 160 ml./min to a mixing tank. Six hundred forty ml./min. of redistilled toluene was added. After extraction and phase separation as in Example I, the toluene product stream containing 19.9% of ε-caprolactam and having a color of 1480 was charged to a counter-current extractor as in Example I. A dilute lactam solution having an ε-caprolactam content of 3.4%, PN content of 67 and color of 19 was also fed to the extractor.

The product stream withdrawn from the extractor contained 24.7% of ε-caprolactam, had a PN content of 880 and color of 1484.

The toluene raffinate stream withdrawn from the counter-current extractor contained only 0.05% of ε-caprolactam.

The aqueous raffinate stream from the phase separator contained 46.5% of ε-caprolactam, had a toluene content of 4.4%, a PN content of 11,000 and color of 191,000.

EXAMPLE III

This example demonstrates that an increase in water content of the mother liquor feed stream improves the removal of color-forming impurities.

One hundred ml. portions of mother liquor feed stream having color of 12,000 were shaken with 400 ml. portions of toluene in a separatory funnel at varying temperatures. Sodium hydroxide was added to a concentration of 0.25%. The results are summarized below:

| Water, percent | Temperature, °C. | Lactam in aqueous phase, percent | PN rejection, percent | Color rejection, percent |
| --- | --- | --- | --- | --- |
| 3 | 30 | None | | |
| 3 | 65 | None | | |
| 5 | 30 | 26 | 65 | 79 |
| 5 | 65 | 17.5 | 60 | 74 |
| 7 | 30 | 37.7 | 65 | 83 |
| 7 | 65 | 22.9 | 64 | 84 |
| 9 | 30 | 44.9 | 66 | 86 |
| 9 | 65 | 24.3 | | 88 |
| 11 | 30 | 43.5 | 66 | 87 |
| 11 | 65 | 38.1 | | 86 |

An increase in the temperature of extraction, while it has little effect on color or PN removal, does somewhat decrease the amount of ε-caprolactam dissolved in the aqueous phase.

EXAMPLE IV

This example demonstrates that the addition of small amounts of sodium hydroxide to the mother liquor feed stream to be extracted with toluene can serve to improve removal of color-forming materials.

One hundred ml./portions of mother liquor feed stream as in Example III diluted to contain 9% of water were extracted with 400 ml. portions of toluene in a separatory funnel. A comparison of the color of the toluene extracts are given below.

| Sodium hydroxide, percent: | Toluene extract color |
| --- | --- |
| 0 | 3180 |
| 0.25 | 1000 |
| 0.50 | 1680 |
| 1.0 | 2140 |

EXAMPLE V

This example demonstrates that better color removal is obtained at higher ratios of toluene to aqueous ε-caprolactam solutions.

Two hundred ml. portions of mother liquor feed having color of 8000 and PN content of 3400 diluted with water were extracted with 3:1 and 4:1 ratios by volume of toluene. The PN and color of the toluene extracts are given below:

| Water, percent | Ratio by volume toluene: water | PN | Color |
| --- | --- | --- | --- |
| 7.2 | 3:1 | 1,440 | 5,840 |
| 7.2 | 4:1 | 1,280 | 3,100 |
| 9.0 | 3:1 | 1,280 | 3,560 |
| 9.0 | 4:1 | 1,200 | 3,000 |

At ratios of 2:1 toluene to mother liquor, no aqueous phase could be separated and the color-forming materials precipitate as a black oil.

EXAMPLE VI

This example establishes that the present process is not selective with respect to removal of color-forming and oxidizable impurities.

Several portions of aqueous lactam product obtained as in Examples 1 and 2 were combined to give a product stream having a PN content of 620 and color of 952. This stream was treated to remove water until water content was reduced to about 7%. The resultant product stream had PN content of 580 and color of 2464 and was extracted first with 4:1 ratio by volume of toluene and then with water following the procedure of Example I. The reextracted product containing 21% of ε-caprolactam, had color of 328, a PN content of 290, contained only 1.0% of aminocaproic acid, and 1130 p.p.m. of cyclohexanone oxime.

EXAMPLE VII

This example establishes that the present process effectively removes the impurity octahydrophenazine from mother liquor feed stream material.

A mother liquor feed stream containing 3.3% of octahydrophenazine was doubly extracted following the procedure of Example I. The product stream contained only 0.27% of octahydrophenazine. The toluene raffinate stream contained 1.0% of this impurity but after distillation, the recycle toluene stream contained only 0.1%. The still bottoms from the toluene distillation step were analyzed to contain 28% of octahydrophenazine, confirming that the major portion of this impurity remains in the waste still bottoms.

We claim:

1. A process for recovering ε-caprolactam from a mother liquor stream obtained from a crystallization of crude ε-caprolactam product which comprises:
   (a) adjusting the feed mother liquor stream to contain from about 0.1 to about 3.0 percent by weight of alkali metal hydroxide,
   (b) extracting the feed mother liquor stream with an organic, water-immiscible solvent for ε-caprolactam, the ratio of solvent to feed stream being from 1:1 to 10:1 by volume,
   (c) separating the organic and aqueous layers,
   (d) extracting the organic layer with an aqueous solvent for ε-caprolactam in a staged counter-current liquid-liquid extractor, and
   (e) recovering the aqueous product stream.

2. A process according to claim 1 wherein the mother liquor feed stream contains up to 10% by weight of water and up to 15% by weight of organic impurities.

3. A process according to claim 1 wherein the mother liquor stream is adjusted to contain from 4 to 16% by weight of water prior to extraction as in step (b).

4. A process according to claim 1 wherein the mother liquor stream is adjusted to contain from 5 to 9% by weight of water and 0.1 to 0.25% by weight of alkali metal hydroxide prior to extraction as in step (b).

5. A process according to claim 4 wherein the ratio of solvent to feed stream in step (b) is from 3:1 to 4:1 by volume.

6. A process according to claim 1 wherein the aqueous solution in step (d) is a dilute ε-caprolactam solution containing up to about 6% by weight of ε-caprolactam.

7. A process according to claim 6 wherein the aqueous solution additionally contains up to 1.0% by weight of a polar compound.

8. A process according to claim 1 wherein the organic solvent is toluene.

9. A process according to claim 1 wherein the aqueous layer obtained from step (c) is treated to recover dissolved ε-caprolactam by extracting with the organic solvent, separating the organic and aqueous layers and recycling the organic layer to step (b).

10. A process according to claim 1 wherein the organic raffinate stream from step (e) is collected, fractionally distilled and the distillate recycled to step (b).

11. A process for recovering ε-caprolactam from a mother liquor stream obtained from a crystallization of crude ε-caprolactam product derived from the Beckmann rearrangement of cyclohexanone oxime which comprises:
 (a) adjusting the feed mother liquor stream to contain from about 5.0 to about 9.0% by weight of water and from about 0.1 to about 0.25% by weight of an alkali metal hydroxide,
 (b) extracting the resultant mother liquor stream with toluene in a ratio by volume of toluene to feed stream of from 3:1 to about 4:1,
 (c) separating the organic and aqueous layers,
 (d) treating the aqueous raffinate layer from step (c) with toluene to extract additional quantities of ε-caprolactam and recycling the toluene solution to step (b),
 (e) extracting the organic product layer from step (c) with an aqueous solution for ε-caprolactam in a staged counter-current liquid-liquid extractor,
 (f) collecting the aqueous ε-caprolactam product solution,
 (g) collecting the toluene raffinate solution,
 (h) distilling the toluene raffinate solution, and recycling the distillate to step (b).

References Cited
UNITED STATES PATENTS

| | | | |
|---|---|---|---|
| 2,221,369 | 11/1940 | Cass | 260—239.3 A |
| 2,692,878 | 10/1954 | Kahr | 260—239.3 A |
| 2,758,991 | 8/1956 | Kretzers et al. | 260—239.3 A |
| 2,817,661 | 12/1957 | Kampschmidt | 260—239.3 A |
| 3,145,198 | 8/1964 | Morbidelli et al. | 260—239.3 A |

HENRY R. JILES, Primary Examiner

R. T. BOND, Assistant Examiner